(No Model.)
D. E. SAMPSON.
FRUIT DRIER.
No. 523,686. Patented July 31, 1894.
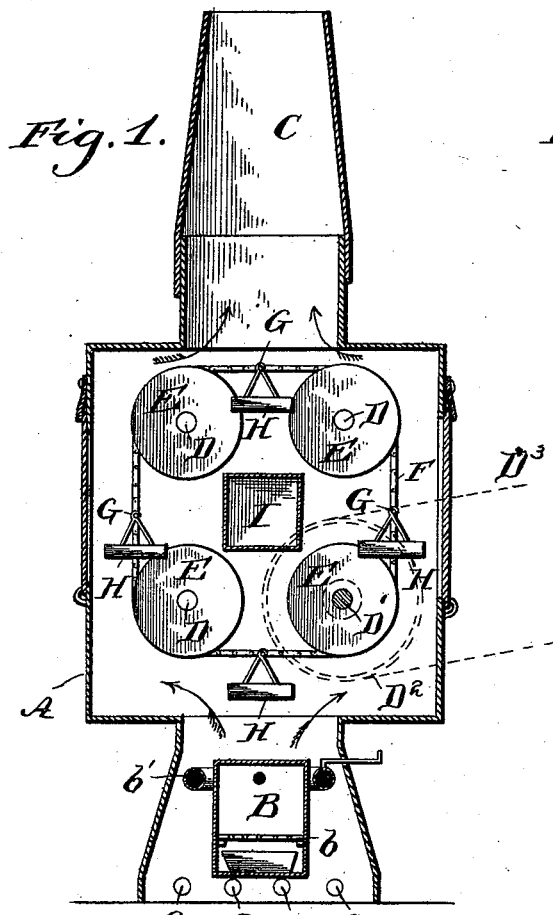
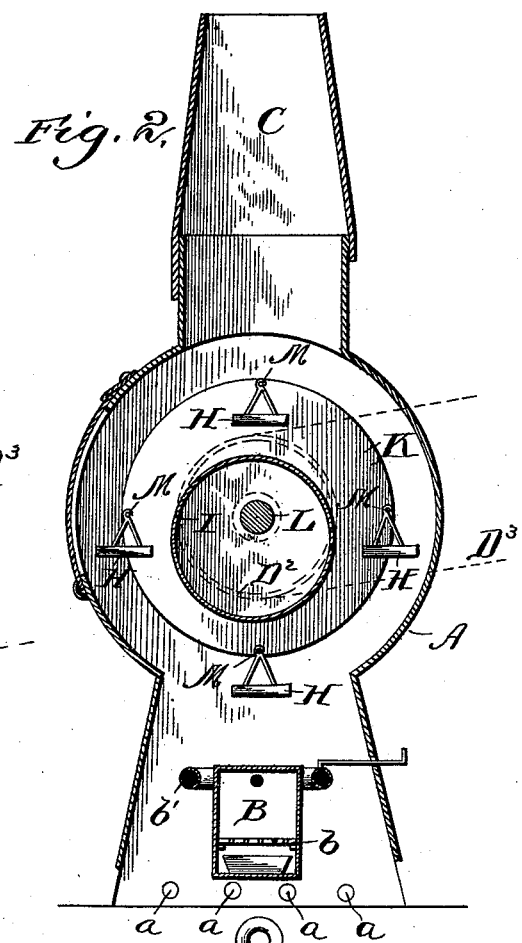
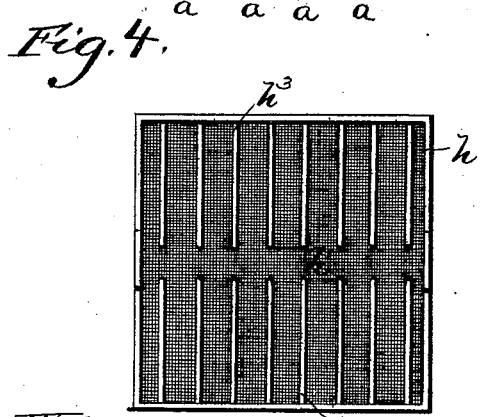
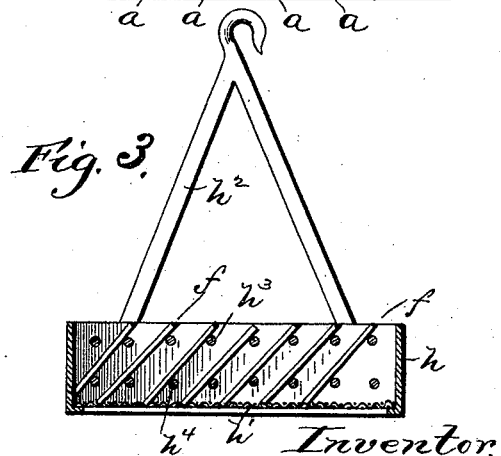
Witnesses:
J. B. McGirr.
F. O. McElvany.
Inventor,
David E. Sampson
by Connolly Bros.
Attys
THE NORRIS PETERS CO., PHOTO-LITHO., WASHINGTON, D. C.

UNITED STATES PATENT OFFICE.

DAVID E. SAMPSON, OF EAST BEND, NORTH CAROLINA.

FRUIT-DRIER.

SPECIFICATION forming part of Letters Patent No. 523,686, dated July 31, 1894.

Application filed April 12, 1893. Serial No. 470,099. (No model.)

*To all whom it may concern:*

Be it known that I, DAVID E. SAMPSON, a subject of the Queen of Great Britain, residing at East Bend, in the county of Yadkin and State of North Carolina, have invented certain new and useful Improvements in Fruit-Driers; and I do hereby declare the following to be a full, clear, and exact description of the invention, such as will enable others skilled in the art to which it appertains to make and use the same.

My invention has relation to fruit driers and has for its object the provision of novel means for drying fruit, vegetables, tobacco or any other substances which it may be desired to dry by subjecting it to the action of heated air and my invention consists in the novel construction, combination and arrangements of parts hereinafter described and constituting an apparatus in which the articles or material to be dried are subjected to the evaporating or drying action of currents of heated air, the article to be acted on being arranged in pans or crates having perforated bottoms through which the heated air can circulate and these pans or crates being suspended from rods or bars which are carried around through the compartment through which the heated air flows so as to expose the different surfaces of the articles or material being dried successively to the direct action of the heated air.

In carrying my invention into effect I provide an apparatus comprising a heating furnace, a chamber for the circulation of heated air, a revolving apron consisting of two endless chains or belts connected by cross arms adapted to sustain the drying pans or crates and carried on revolving drums or wheels, and crates or pans of novel construction adapted to receive the fruit, vegetables or other material to be dried and maintain the same in such position that all the surfaces of the same will be successively exposed to the direct impact of the currents of heated air proceeding from the furnace through the drying chamber.

While I prefer to employ endless chains or belts connected by cross arms and passing over revolving drums or wheels for the suspension of the drying pans or crates, I can, where desirable, substitute for such endless chains or belts, cylindrical open drums composed of circular heads connected by cross arms, the heads being secured on a revolving shaft, and I have shown this arrangement in the drawings as a modification of my invention, the pans employed in both forms of apparatus being the same.

Referring to the accompanying drawings Figure 1, is a vertical longitudinal sectional view of the preferred form of apparatus; Fig. 2, a similar view of the modified form of the same; Fig. 3, a sectional view of one of the drying pans; Fig. 4, a top view of a modified form of pan, intended particularly for use in drying tobacco.

A, designates a chamber of any desired capacity the lower end of which communicates with a furnace B, and the upper end of which is provided with a stack or chimney C. The furnace B, is of rectangular form and is provided with a grate $b$, and a pipe $b'$, for the circulation of air and the products of combustion proceeding from the furnace, the pipe $b'$ projecting through the side of the chamber A, and leading to the open air so as to convey away the products of combustion from the vicinity of the material being dried. The furnace B, is also provided with the necessary doors, dampers and other appurtenances and is so arranged relatively to the chamber A, that fuel may be fed to the fire and ashes removed without opening or in any way disturbing the chamber A, the doors of the furnace being outside the walls of the drying chamber and the handles of the dampers being projected through the walls of the chamber so that they may be operated from the outside.

A considerable space is left between the walls of the drying chamber A, and the side walls of the furnace, so as to permit air to circulate up around the sides of the furnace, and ports $a$, $a$, $a$, are provided for the ingress of air from outside the walls of the chamber, such holes being near the bottom of the furnace as shown so as to expose as much as possible of the surface of the furnace to the impact of the incoming air.

In the apparatus illustrated in Fig. 1, of the drawings the chamber A, is of rectangular form and is provided with four shafts D, D, D, D', the latter of which carries on its end a band wheel $D^2$, to which power is communicated from any suitable source, such as a steam engine, by a belt $D^3$. The shafts D, D, D, D' are journaled in the end walls of the drying chamber and the end of the shaft D', projects through the wall so as to receive the band wheel $D^2$. Upon the shafts D, D, D, D', are carried sprocket wheels E, E, E, E, one of such wheels being placed near the end of each shaft and upon these wheels travel endless chains or bands F, F, carrying cross arms or rods G, G, G, G, upon which are suspended the drying pans H, H, H, H. A rectangular metallic box I, is arranged at the center of the drying chamber so as to deflect the heated air from the center of the chamber toward the band on each side, the direction of the air being indicated by arrows in Fig. 1.

In the modified form of apparatus illustrated in Fig. 2, I have substituted for the endless chains and sprocket wheels two circular heads K, K, mounted on a shaft L, and having cross arms or rods M, M, upon which are suspended the drying pans H, H, H, H. In this form of apparatus the power is communicated to the shaft L, and the deflecting box I, is cylindrical in form as shown.

The drying pans H, H, which are shown in detail in Fig. 3 of the drawings are of rectangular form and consist of a base or body portion $h$, and a perforated bottom $h'$. The pans or crates may be made of wood or metal, but I prefer to make them of thin metal, as tinned sheet iron, and to form the bottom from wire cloth or perforated sheet metal. These pans are hung from the cross rods G, G, or M, M, so as to swing freely by stirrups or straps $h^2$ $h^2$, one at each end, the stirrups or straps being formed with hooks at their upper ends so that the pans may be readily hung on to or detached from the cross rods at pleasure. A series of wire rods $h^3$, $h^3$, are fixed in the pans near the top edge of the same and a second series of similar rods $h^4$, $h^4$, are fixed in the pans near the bottoms of the same, the purpose of these rods being to support the fruit or other material designated by the letters $f, f$, being dried in a substantially upright position or on edge, as clearly shown in Fig. 3, of the drawings. This manner of setting the fruit in an upright position or on the edge is of great importance as it permits of a free circulation of the heated air between and around every piece of material in each of the pans and thus greatly facilitates the drying operation. Furthermore it greatly increases the holding capacity of each pan and the pieces being held separate and apart by the cross wires there is no danger of their becoming molded or damaged during the drying operation.

In Fig. 3, of the drawings I have shown the two series of rods $h^3$, $h^3$, and $h^4$, $h^4$, as extending entirely across the pans, and this form of pan is specially adapted for drying certain fruits and vegetables which it is desired to dry in large flat sections, but in Fig. 4, of the drawings I have shown a modified form of pan in which the rods $h^3$, and $h^4$, do not extend entirely across the pans, but extend nearly to the middle from each side. In this form of pan the material to be dried is hung on the rods by passing the material over the ends of the rods and then pressing it back on the same, the manner in which the material is thus secured in position with its edge toward the bottom of the pan being clearly indicated in the drawings.

Having described my invention, I claim—

In a fruit drier, the drying pans consisting of the bodies $h, h$, the perforated bottoms $h'$ and the transversely arranged rods or wires $h^3$, and $h^4$ for supporting the material to be dried in an upright position, substantially as described.

In testimony whereof I have affixed my signature in presence of two witnesses.

DAVID E. SAMPSON.

Witnesses:
  ARCHIBALD T. SAMPSON,
  THEODORE A. BURNETT.